H. KORTEN.
WATER PURIFIER.
APPLICATION FILED MAY 23, 1907.
901,352.
Patented Oct. 20, 1908.
3 SHEETS—SHEET 2.
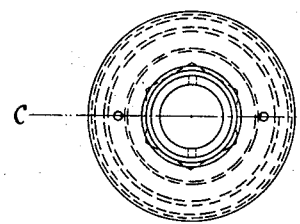
Fig. 6.
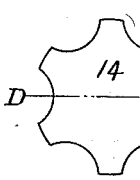
Fig. 9.
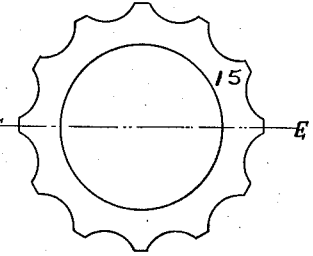
Fig. 11.
Fig. 10.
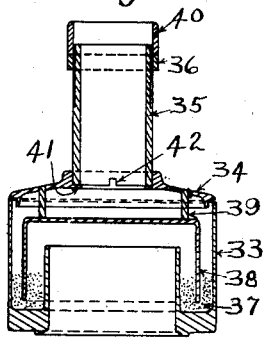
Fig. 7.
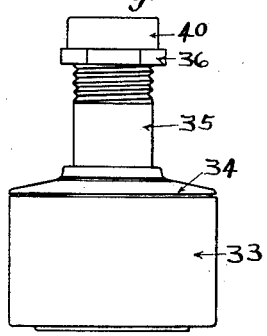
Fig. 8. Fig. 12.
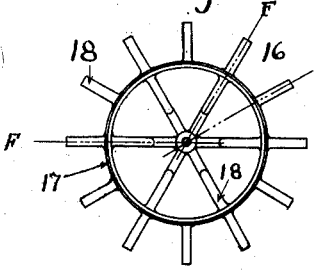
Fig. 13.
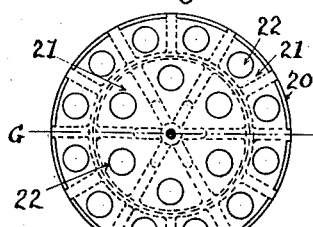
Fig. 15.
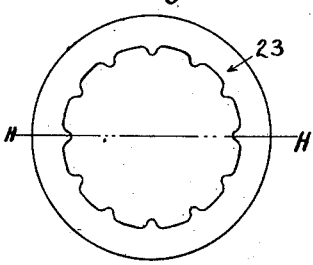
Fig. 17.
Fig. 14. Fig. 16. Fig. 18.
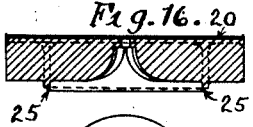
Fig. 19.
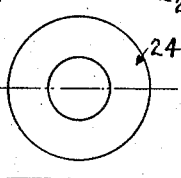
Fig. 20.
Witnesses
Jno. W. Dady
M. D. Phillips
Henry Korten
Inventor
By Joshua R. H. Potts
Attorney

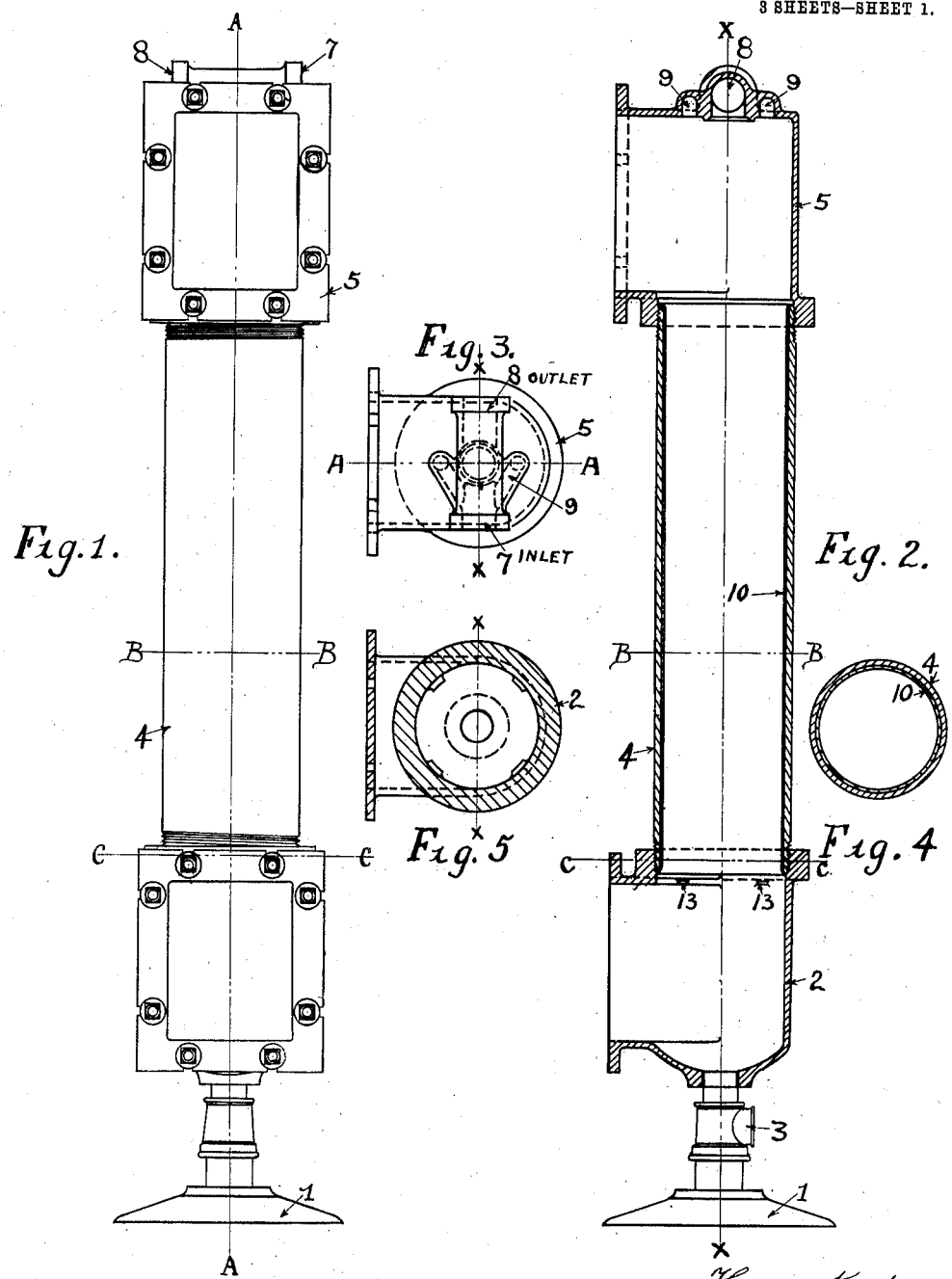

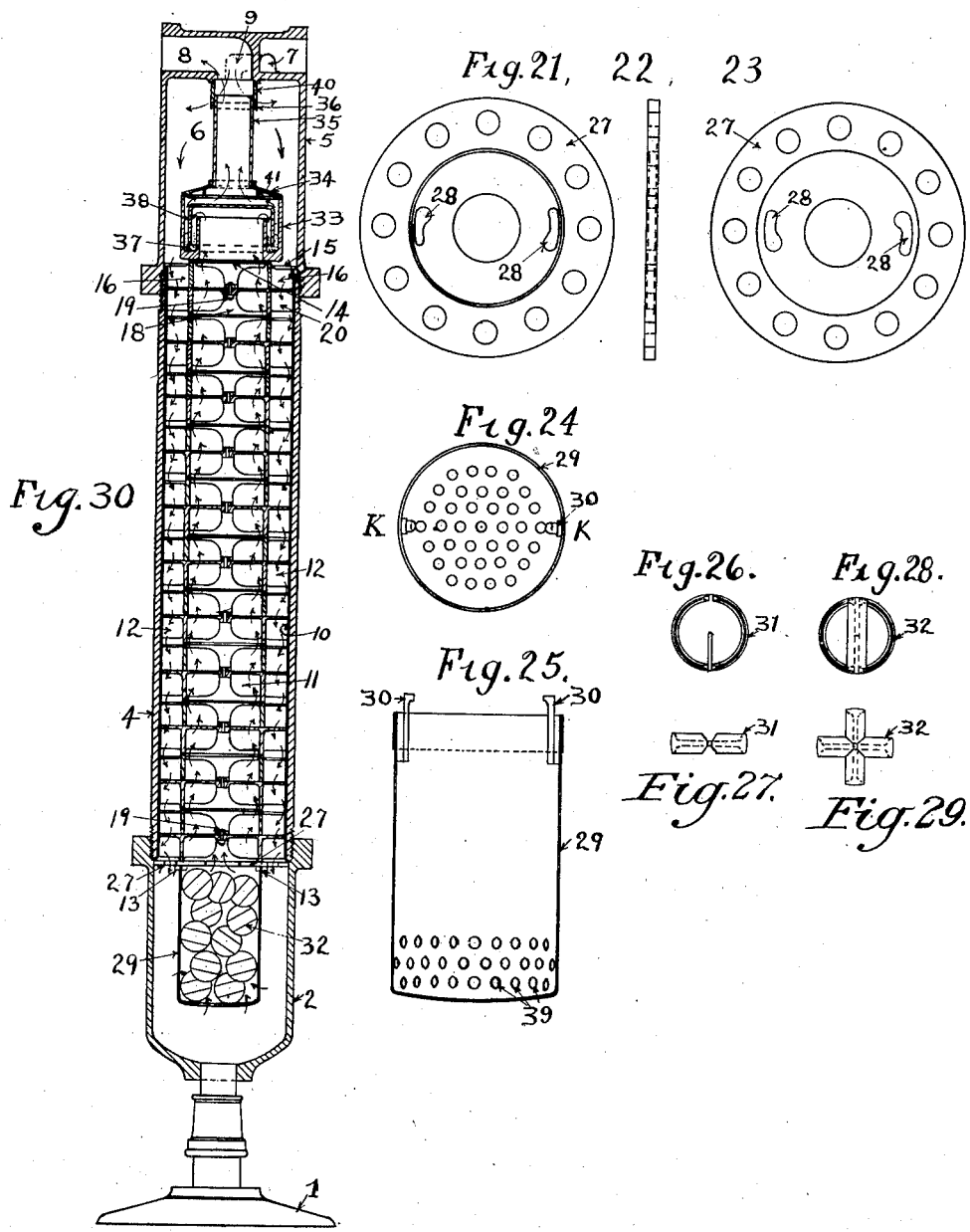

UNITED STATES PATENT OFFICE.

HENRY KORTEN, OF CHICAGO, ILLINOIS, ASSIGNOR TO FREDERICK Y. NICHOLS, OF CHICAGO, ILLINOIS.

WATER-PURIFIER.

No. 901,352.   Specification of Letters Patent.   Patented Oct. 20, 1908.

Application filed May 23, 1907. Serial No. 375,194.

*To all whom it may concern:*

Be it known that I, HENRY KORTEN, a citizen of the United States, residing at Chicago, in the county of Cook and State of Illinois, have invented certain new and useful Improvements in Water-Purifiers, of which the following is a specification.

The present invention relates to certain new and useful improvements in "water purifiers" for general purposes, but especially for feed water for steam boilers and for other purposes where non-scale-forming water is required.

The object of my invention is to produce a water purifier in which water may be freed from a large percentage of the impurities contained in it, either in solution or in mechanical suspension, and which will reduce the remaining impurities to non-scale-forming substances.

A further object is to produce a purifier that will act continuously and automatically without requiring attention and without material obstruction to the flow of water.

A further object is to produce a purifier in which the solid foreign matter removed from the water will be so deposited as not to interfere with the flow of water and so as to be readily removable by "blowing off" without removing any of the parts of the purifier.

A further object is to produce a purifier that will but seldom require renewal of its active elements and in which the same can be removed and renewed by manual manipulation without the use of tools.

A further object is to produce a purifier that will operate with increased efficiency and rapidity under the influence of heat applied either to the water before entering the purifier or applied to the purifier direct.

With the above objects in view and further objects which will appear as the nature of my invention is more fully disclosed, I have invented a new and useful water purifier and, while claiming every form in which the invention defined by the appended claims may be embodied have illustrated one embodiment thereof on the annexed drawings, in which:

Figure 1 is a side view of the exterior portions of my purifier showing the cover plates that give access to its interior arrangements. Fig. 2 is a sectional view on the line A—A of Fig. 1 with the cover plates removed. Fig. 3 is a top plan view of Fig. 1. Fig. 4 is a sectional view on the line B—B, Figs. 1 and 2. Fig. 5 is a sectional view on the line C—C, Figs. 1 and 2. Fig. 6 is a top plan view of the mercury seal at the top of the purifier. Fig. 7 is a sectional view of Fig. 6 on the line C—C. Fig. 8 is an exterior side view of the mercury seal. Figs. 9 and 10 are plan and sectional views of one of the elements of a repeating series of electro-positive plates which occupy the interior of the purifier. Figs. 11 and 12, 13 and 14, 15 and 16, 17, and 18, 19 and 20 are plan and sectional views of other positive elements making up the series of electroplates which is repeated from the top downward in the purifier. Figs. 21, 22, and 23 represent respectively top, side and bottom views of the bottom electroplate, the last of the whole positive series. Figs. 24 and 25 are top and sectional views of a copper or other electro negative perforated metal basket, which is suspended from the bottom of the series of electro positive plates shown in Figs. 9 to 20. Figs. 26 and 27 are plan and side views of electro positive slotted disks which are placed in the basket of Fig. 25. Figs. 28 and 29 are plan and side views of two of the disks of Fig. 26 as they are meshed together when placed in the basket of Fig. 25. Fig. 30 is a sectional view of the entire apparatus on the line X—X of Figs. 2, 3 and 5.

Similar reference characters are used to designate corresponding parts of the apparatus throughout the several views.

1 is the base of the purifier screwed into the lower chamber 2 and provided with the pipe outlet 3 through which the lower chamber can be "blown off" to remove sediment. The lower chamber 2 is provided with a threaded opening in its upper side into which the cylinder 4, forming the central portion of the purifier, is screwed. The opposite end of the cylinder 4 is screwed into an upper section 5 having the chamber 6, the inlet port 7, and the outlet port 8. The inlet 7 has branch passages 9 leading to the chamber 6 on either side of the outlet passage 8 which enters centrally at the top of the chamber. The cylindrical portion 4 of the purifier is provided with a copper lining 10 and contains throughout its length a series of zinc or zinc amalgam electroplates resting at the bottom on the iron plate 27 which rests on lugs 13 in the lower chamber 2 and so disposed that they form an inner cylindrical space 11 and an outer annular space 12 which spaces afford tortuous passages through and between the perforations and projections of the electroplates. The electroplates are used in sets of six members shown in detail in Figs. 9 to 20 and assembled in Fig. 30, the number of sets used being governed by the length of the cylinder 4. 14 and 15 are the first two plates at the top of a set. They rest upon the plate 16 which is formed of a ring 17 (Figs. 13 and 14) having radial arms or webs 18, the plate 14 lying inside of the ring and 15 lying outside. The plate 16 is in turn supported on and bolted centrally to the plate 20 (Figs. 15 and 16) by the bolt 19 (Fig. 30). This plate 20 is similar to plate 16 inverted but in addition to the ring and arms it has on its upper side a horizontal web 21 with the perforations 22. Below the plate 20 are plates 23 and 24 which are placed respectively around and within the projecting ring of plate 20 thus completing the set. The ring of plate 20 has a projecting edge 25 which registers in a corresponding recess 26 in plate 16 of the second set thus forming a continuous tight cylinder built up of the rings. The sets of plates are continued downwardly to the bottom of cylinder 4 where the bottom plate 27 rests on the lugs 13. This bottom plate 27 is formed as clearly shown in Figs. 21, 22, and 23 and has the slotted holes 28 for supporting the metal basket 29 (shown in Figs. 24 and 25) by means of the hooks 30. This basket is filled with the disks 31 placed together as shown at 32 (Figs. 28 and 29).

The chamber 6 (Fig. 30) contains an annular cup 33 which fits in the recess 26 of the top plate 16. This annular cup has a cover 34 into which are fitted the pins 39 to keep inverted cup 38 properly immersed in the mercury, fitting the top of the cup and having a central aperture provided with web 41, on which rests the lower end of conduit 35, and lugs or ears 42 which fit into suitable slots in said conduit 35 to keep it from moving. This conduit, preferably a brass pipe, communicates with the outlet passage 8 by means of a threaded ring 36 on its upper portion which can be screwed up against the lower side of ring 40 which fits into the outlet 8 to form a tight joint. The annular cup 33 contains mercury in the annular space 37 into which the rim of an inverted cup 38 is immersed thus forming a mercury seal between the center of the annular cup 33 and the conduit 35.

Having now described its various parts the operation of the purifier will be readily understood: The water enters the port 7 and passes to the chamber 6 by the branch passages 9. It then flows downwardly with a zigzag movement created by the position of apertures and ribs of plates 15, 16, 20 and 23 as shown by the arrows in Fig. 30, through the annular space 12 to the lower chamber 2. Here it enters the basket 29 through the various apertures 39 where it comes in contact with the disks 32 and then ascends in the central cylindrical space 11 with a zigzag movement created by the position of apertures and ribs of plates 24, 20, 16 and 14 as shown by the arrows in Fig. 30 from which it passes through the mercury seal in the cup 33 and the conduit 35 to the outlet 8.

The electro plates in the cylinder, 4, and the disks, 32 being of opposite polarity from the lining 10 of the cylinder and the basket, 29, the presence of the water sets up galvanic action between them, the effect of which is to reduce the scale forming carbonates and sulfates to oxids and other non-scale forming substances, a portion of which are insoluble. The tortuous passage of the water through the zigzag openings in the plate provides large surface contact on the plates to insure practically all the water being electrically acted upon; while the devious flow agitates the water to such an extent as to cause the insoluble particles held in suspension to accumulate and cohere in masses of sufficient size to settle as a precipitate in the lower chamber, 2, whence it can be withdrawn at any time through the outlet, 3, or so that they may be more readily removed by the mercury filter at the top. The mercury filter is especially efficient in removing the oil and grease from the water, as the difference in specific gravity between the oil and the mercury is so great that the oil cannot pass downwardly through it. The mercury acting as an electrode increases the electrical action within the device and hence, serves in the dual capacity of filtering substance and supplementary electrode. In this latter capacity, that is, to increase the electrical action, mercury may be used also by forming the electro-positive plate of zinc amalgam.

Since the efficiency of my purifier depends upon the degree of electrical action set up its action may be greatly accelerated by the application of heat. Accordingly I heat the water to about 160 degrees Fahrenheit where large working capacity is required or other considerations make it desirable to do so.

Having now fully described one embodiment of my invention, what I claim is:

1. In an apparatus of the class described, a suitable casing, means therein for electrically decomposing the scale forming impurities held in solution and for causing the impurities held in suspension to cohere in masses, a sediment chamber to receive the heavier portions of said masses and a mercury filter at the top of said casing for removing the lighter impurities, substantially as described.

2. In an apparatus of the class described the combination with an outer casing of inlet and outlet ports at the top of said casing, a vertical series of perforated electroplates extending downwardly in said casing, interlocking rings on said electroplates forming outer and inner vertical passages, a sediment chamber at the bottom of said casing, and means for conducting water from the inlet in a circuitous course downwardly through one vertical passage and upward in a circuitous course through the other vertical passage to the outlet.

3. In an apparatus of the class described the combination with an outer casing of a series of electroplates in said casing, and a perforated metallic basket containing interlocking disks at the bottom of said series of electroplates.

4. In an apparatus of the class described, the combination with an outer casing of a series of electroplates having projections and perforations and interlocking rings to form outer and inner circuitous passages vertically in said casing, and means for conducting water downwardly through the outer passage and upwardly through the inner passage.

5. In an apparatus of the class described, the combination of relatively electro-positive and electro-negative electrodes with a mercury filter for removing impurities held in suspension and also adapted to act as a supplementary electrode substantially as described.

6. In an apparatus of the class described, the combination of an outer casing, electroplates therein, means for conducting the water over the surfaces of said electroplates and a mercury seal for arresting suspended matter in the water passing therethrough by mechanical and electrical action.

7. In an apparatus of the class described, the combination of an outer casing, inlet and outlet ports in the top thereof, a sediment chamber in the bottom thereof, outer and inner vertical passages formed by electroplates in said casing, means for conducting water down through one passage and up through the other, and a mercury seal through which to pass the water after passing over the electroplates.

In testimony whereof I have signed my name to this specification in the presence of two subscribing witnesses.

HENRY KORTEN.

Witnesses:
 FRANCES E. SHEEHY,
 HELEN F. LILLIS.